United States Patent
Hung et al.

(10) Patent No.: US 8,368,660 B2
(45) Date of Patent: Feb. 5, 2013

(54) CAPACITIVE TOUCH SYSTEM AND SENSING METHOD FOR A CAPACITIVE TOUCH SYSTEM

(75) Inventors: Tse-Lun Hung, Taipei (TW); Jung-Shou Huang, Da-an Shiang (TW); Hsin-Shieh Tsai, Yuanlin Town (TW)

(73) Assignee: Elan Microelectronics Corporation, Hsinchu (TW)

( * ) Notice: Subject to any disclaimer, the term of this patent is extended or adjusted under 35 U.S.C. 154(b) by 606 days.

(21) Appl. No.: 12/453,641

(22) Filed: May 18, 2009

(65) Prior Publication Data

US 2009/0284494 A1    Nov. 19, 2009

(30) Foreign Application Priority Data

May 19, 2008    (TW) ................................ 97118426 A

(51) Int. Cl.
*G06F 3/041*    (2006.01)

(52) U.S. Cl. ...................................................... 345/173

(58) Field of Classification Search .................. 345/173; 178/18.01

See application file for complete search history.

(56) References Cited

U.S. PATENT DOCUMENTS

| | | | | |
|---|---|---|---|---|
| 5,136,282 A * | 8/1992 | Inaba et al. | ..................... | 345/97 |
| 5,392,058 A * | 2/1995 | Tagawa | .......................... | 345/104 |
| 2001/0022565 A1* | 9/2001 | Kimura | ........................... | 345/82 |
| 2006/0092115 A1* | 5/2006 | Matono et al. | .................. | 345/90 |
| 2008/0042992 A1* | 2/2008 | Kim | ............................. | 345/173 |
| 2009/0058818 A1* | 3/2009 | Chang et al. | .................. | 345/173 |

* cited by examiner

*Primary Examiner* — Alexander S Beck
*Assistant Examiner* — Nguyen H Truong
(74) *Attorney, Agent, or Firm* — Muncy, Geissler, Olds & Lowe, PLLC

(57) ABSTRACT

A capacitive touch system includes a touch panel and two touch integrated circuits connected to the touch panel to scan thereto. The touch panel has a boundary trace connected to both of the two touch integrated circuits. When one of the two touch integrated circuits charges/discharges the boundary trace, the other touch integrated circuit does not charges/discharges the boundary trace.

10 Claims, 7 Drawing Sheets

CAPACITIVE TOUCH SYSTEM AND SENSING METHOD FOR A CAPACITIVE TOUCH SYSTEM

FIELD OF THE INVENTION

The present invention is related to a capacitive touch system and a sensing method for a capacitive touch system.

BACKGROUND OF THE INVENTION

In conventional applications, all the large scale capacitive touch panels use a surface capacitance sensing technique to scan thereto for determining a touch information, which uses a set of detecting currents, each directed to an endpoint of the large scale touch panel to produce detected values, and therefore, even multiple fingers simultaneously touch the large scale touch panel, this sensing technique still retrieves only one set of detected currents in response to this multi-finger touch. For this reason, the surface capacitance sensing technique can identify only one set of absolute coordinates. In a two dimensional matrix for instance, only one set of parameters (X,Y) will be determined, and thereby it can't implement a multi-finger touch detection.

An all points addressable (APA) projected capacitance sensing technique is capable of implementing a multi-finger touch detection, but not applicable to large scale touch panels because, to implement this sensing technique, it is necessary to charge and discharge each point sensor on the large scale touch panel. Taking a matrix-type touch panel for example, when the X and Y traces increase, the pixel number of an APA projected capacitance touch panel dramatically increases and thereby significantly degrades the frame rate of the touch panel due to the very long time period for scanning the large scale touch panel in a frame.

An axis intersect (AI) projected capacitance sensing technique is also capable of implementing a multi-finger touch detection, but not applicable to large scale touch panels, too. FIG. 1 is a schematic diagram of a conventional AI projected capacitance sensing technique applied to a small scale touch panel 10, in which an AI projected capacitance touch IC 12 is used to scan the small scale touch panel 10. Assuming that the AI projected capacitance touch IC 12 can support up to twenty-two traces, a good frame rate can be attained for a small scale touch panel 10 having ten X traces TRX1-TRX10 and ten Y traces TRY1-TRY10. However, if a this type touch IC 12 is applied to a large scale touch panel 14 having forty X traces TRX1-TRX40 and forty Y traces TRY1-TRY40, as shown in FIG. 2, the total number of traces that the touch IC 12 needs to scan dramatically increases. Moreover, the frame rate of the overall touch panel application is dependent to a very large extent on the time it takes the touch IC 12 to charge and discharge capacitors each time. In other words, the frame rate is determined mainly by the time in a frame that the touch IC 12 charges and discharges the capacitors. Hence, if an AI projected capacitance touch IC capable of scanning a greater number of traces is applied to a large scale touch panel 14, a major drawback would be a significantly decreased frame rate in the overall application, which leads to compromised performance at the application end.

SUMMARY OF THE INVENTION

An object of the present invention is to provide a capacitive touch system.

Another object of the present invention is to provide a sensing method for a capacitive touch system.

According to the present invention, a capacitive touch system includes a touch panel and two touch integrated circuits connected to the touch panel to scan thereto. The touch panel has a boundary trace. The two touch integrated circuits both are connected to the boundary trace, but do not charge/discharge thereto simultaneously. When one of the two touch integrated circuits charges/discharges the boundary trace, the boundary trace is floating or has a high impedance to the other touch integrated circuit. By this way, the boundary problem caused by using more than two touch integrated circuits to scan a touch panel is eliminated. In addition, the difference between two sensed values retrieved by two touch integrated circuits for a same trace can be used at a backend circuit to eliminate the difference between the sensed values retrieved by the two touch integrated circuits. Moreover, two sensed values retrieved by two touch integrated circuits for a same trace can be filtered to produce a value used as the sensed value of the trace, thereby reducing the influence of noise.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
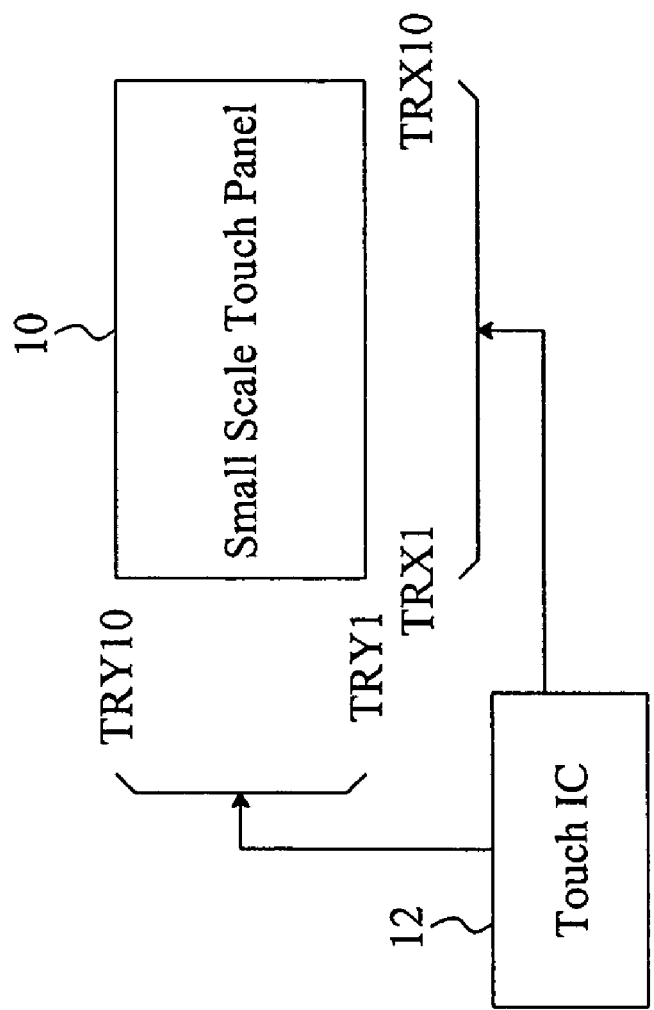
FIG. 1 is a schematic diagram of a conventional AI projected capacitance sensing technique applied to a small scale touch panel.
Figure 2:
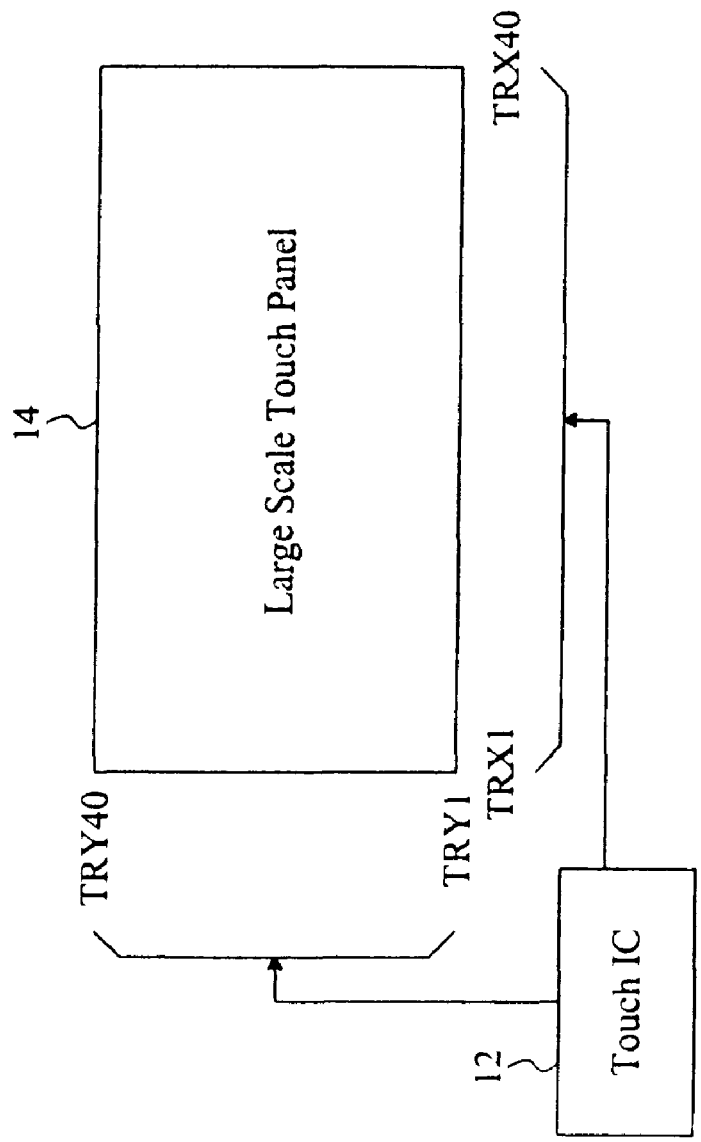
FIG. 2 is a schematic diagram of a conventional AI projected capacitance sensing technique applied to a large scale touch panel.
Figure 3:
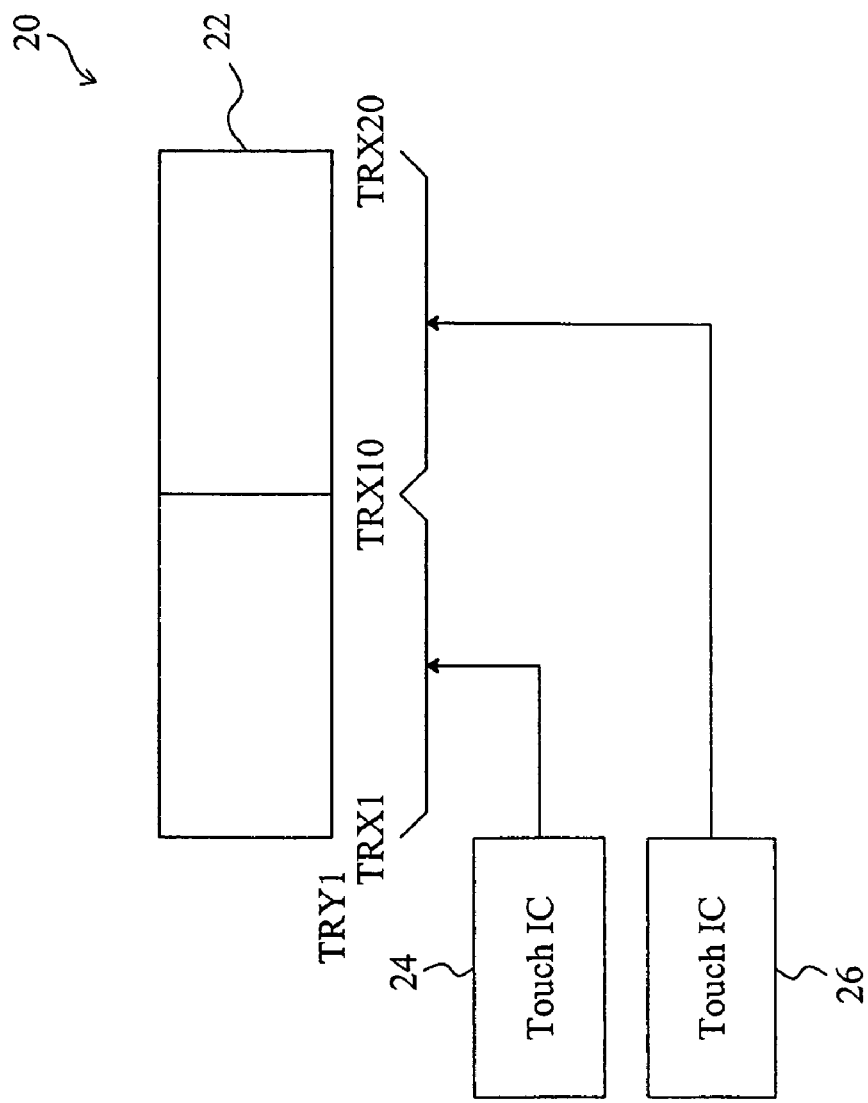
FIG. 3 is a schematic diagram of a capacitive touch system using at least two AI projected capacitance touch ICs to scan a touch panel.
Figure 4:
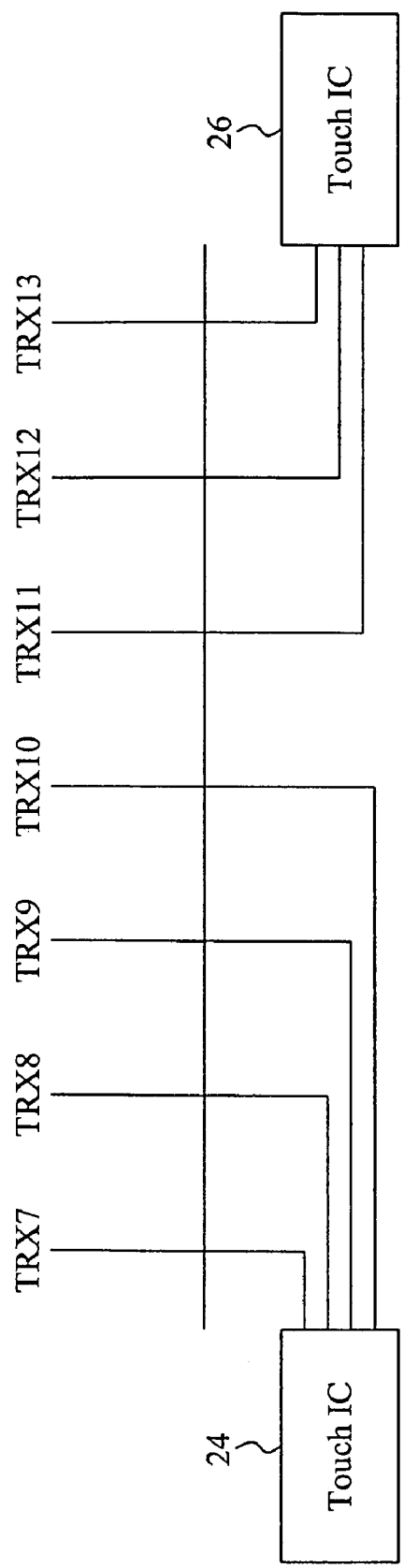
FIG. 4 is a schematic diagram of an enlarged portion of the capacitive touch system of FIG. 3.

As shown in FIG. 3, a capacitive touch system 20 uses at least two AI projected capacitance touch ICs 24 and 26 to scan a touch panel 22. The touch panel 22 has a plurality of first traces TRX1-TRX10 connected to the touch IC 24, and a plurality of second traces TRX11-TRX20 connected to the touch IC 26, of which the first one TRX11 of the second traces TRX11-TRX20 is next to the last one TRX10 of the first traces TRX1-TRX10. FIG. 4 is a schematic diagram of an enlarged portion of the capacitive touch system 20, which shows the boundary trace TRX10 and its neighboring traces. In the capacitive touch system 20, the touch IC 24 is responsible for scanning the traces TRX1-TRX10, and the touch IC 26 is responsible for scanning the traces TRX11-TRX20. By using the touch ICs 24 and 26 to simultaneously scan the touch panel 22, a multi-finger touch detection and a good frame rate can be achieved, even the touch panel 22 is a large scale touch panel. Conventionally, a capacitive touch IC for a small scale touch panel generally uses two traces to determine a sensed value for a trace, by which the trace to be sensed and the neighboring one next to this trace (with their capacitors) are simultaneously charged thereto and discharged therefrom to obtain two analog-to-digital conversion (ADC) values therefrom, and then a better ADC value is produced by calculating with these two ADC values as the sensed value of the trace to be sensed.

If the above sensing method is applied to a capacitive touch system using at least two capacitive touch ICs to scan the traces in a same direction, as that shown in 4, there will be a boundary issue. When the touch IC 24 scans the traces TRX1-TRX10, the sensed values of the traces TRX1-TRX9 could be determined by the conventional sensing method. For example, to determine a sensed value for the trace TRX7, both the traces TRX7 and TRX8 are charged thereto and discharged therefrom at a same time to obtain the ADC values of the traces TRX7 and TRX8, and then these two ADC values are used to determine the sensed value of the trace TRX7. Similarly, the ADC values of the traces TRX8 and TRX9 are used to determine a sensed value for the trace TRX8, and the ADC values of the traces TRX9 and TRX10 are used to determine a sensed value for the trace TRX9. For the boundary trace TRX10, however, the next trace TRX11 is connected to another touch IC 26, instead of the touch IC 24, and thus the touch IC 24 cannot determine a sensed value for the trace TRX10 as done by the conventional sensing method. Since the trace TRX11 is not connected to the touch IC 24, the sensed value of the trace TRX10 is determined by the ADC value of the trace TRX10 itself alone. As a result, the sensed value of the trace TRX10 may be incorrect or smaller than it should be.

Figure 5:
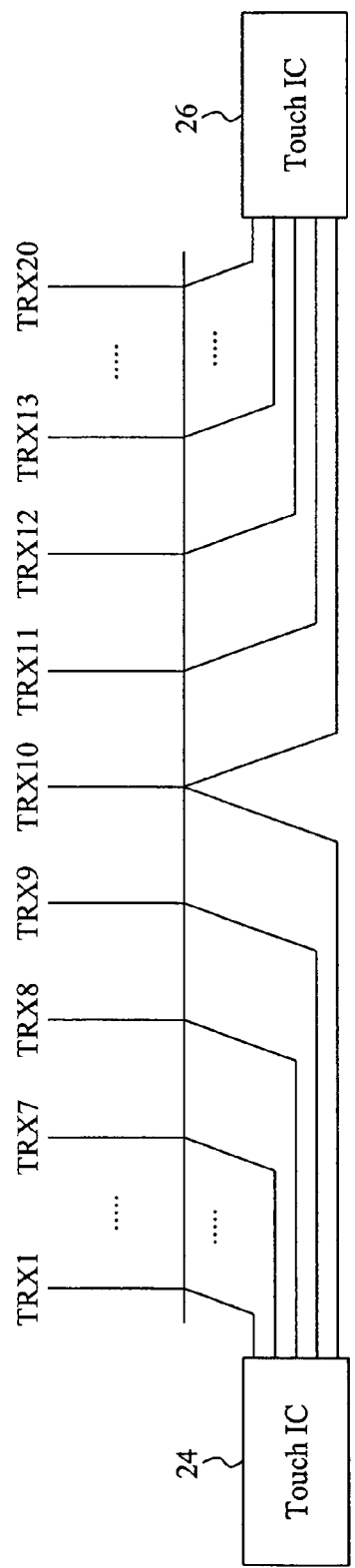
FIG. 5 is a schematic diagram showing a first embodiment according to the present invention.

According to the present invention, a trace overlapping layout is proposed to solve the above boundary problem caused by using at least two capacitive touch ICs to scan the traces in a same direction of a touch panel. FIG. 5 is a schematic diagram showing a first embodiment according to the present invention, in which the touch IC 24 is connected to the traces TRX1-TRX10 as it was in a conventional capacitive touch system. However, in addition to the traces TRX11-TRX20, the boundary trace TRX10 is also connected to the touch IC 26. In other words, the trace TRX10 overlaps in its connection with the touch ICs 24 and 26. With this arrangement, the trace TRX10 could be charged/discharged by either the touch IC 24 or the touch IC 26. In the process of charging/discharging two neighboring traces at a same time, the touch IC 24 does not charge/discharge the boundary trace TRX10 while scanning the traces TRX1-TRX8. Therefore, if the trace TRX10 is set to be floating or have a high impedance to the touch IC 24 during the touch IC 24 scanning the traces TRX1-TRX8, the touch IC 26 can charge/discharge the trace TRX10 without affecting the touch IC 24 during the touch IC 24 scanning the traces TRX1-TRX8. Similarly, the touch IC 24 can charge/discharge the trace TRX10 without affecting the touch IC 26 if the trace TRX10 is floating or has a high impedance to the touch control IC 26. In other words, the touch ICs 24 and 26 do not charge/discharge the boundary trace TRX10 at a same time. When one of the touch ICs 24 and 26 charges/discharges the boundary trace TRX10, the boundary trace TRX10 is floating or has a high impedance to the other of the touch ICs 24 and 26. Furthermore, assuming that the touch ICs 24 and 26 start scanning their responsible traces simultaneously, when the touch IC 24 charges/discharges the traces TRX1 and TRX2 to retrieve a sensed value for the trace TRX1, the touch IC 26 can charge/discharge the traces TRX10 and TRX11 to retrieve a sensed value for the trace TRX10, thereby eliminating the boundary problem. At this time, the trace TRX10 is floating or has a high impedance to the touch IC 24, so that the touch IC 26 is allowed to charge/discharge the trace TRX10 without affecting the touch IC 24. When the touch IC 24 charges/discharges the traces TRX9 and TRX10 to obtain a sensed value for the trace TRX9, the touch IC 26 does not charge/discharge the trace TRX10. At this time, the trace TRX10 is floating or has a high impedance to the touch IC 26, thereby allowing the touch IC 24 to charge/discharge the trace TRX10 without affecting the touch IC 26.

Figure 6:
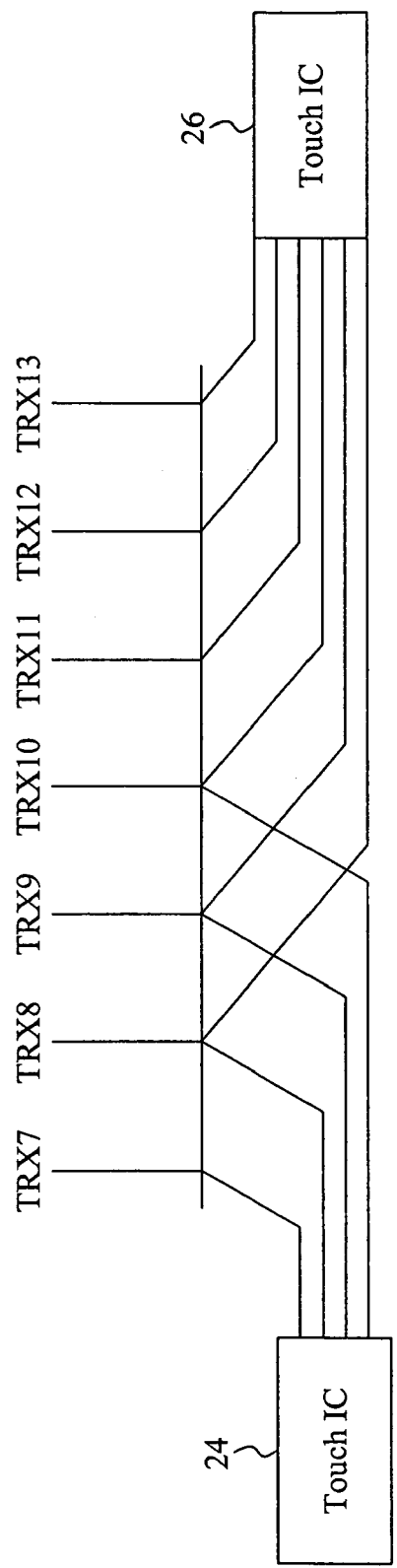
FIG. 6 is a schematic diagram showing a second embodiment according to the present invention.

FIG. 6 is a schematic diagram showing a second embodiment according to the present invention, in which more boundary traces TRX8, TRX9 and TRX10 are connected to both of the touch ICs 24 and 26. As mentioned above, the touch ICs 24 and 26 do not charge/discharge a same one of the trace TRX8, TRX9 or TRX10 simultaneously. For example, when the touch IC 24 charges/discharges the trace TRX8, the trace TRX8 is floating or has a high impedance to the touch IC 26. Similarly, when the touch IC 26 charges/discharges the trace TRX8, the trace TRX8 is floating or has a high impedance to the touch IC 24. In this embodiment, if there are two traces to be selected to be charged/discharged each time, both the touch ICs 24 and 26 will obtain sensed values of the traces TRX8 and TRX9. Hence, the sensed values obtained by the touch ICs 24 and 26 for a same trace can be filtered, for example by being averaged, to reduce the difference between the touch ICs 24 and 26 after preliminary calibration, and obtain the difference between the sensed values, thereby producing a better sensed value.

Figure 7:
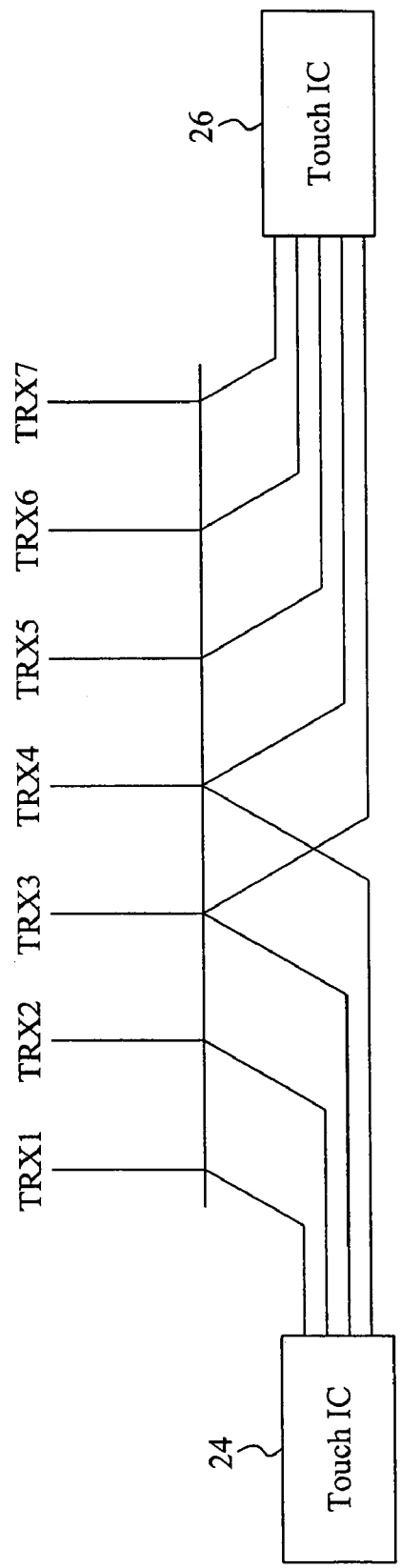
FIG. 7 is a schematic diagram showing a third embodiment according to the present invention.

If there are two traces are selected to be charged/discharged each time, the trace overlapping layout of the present invention can be extended to such extent that, when the touch IC 24 charges/discharges traces TRX[N] and TRX[N+1], the touch IC 26 charges/discharges traces TRX[N+2] and TRX[N+3], whereas all the pins that are not used in charging/discharging are set to be floating or have a high impedance. FIG. 7 is a schematic diagram showing a third embodiment according to the present invention issue. When the touch IC 24 selects the traces TRX1 and TRX2 to retrieve a sensed value for the trace TRX1, the touch IC 26 selects the next two traces TRX3 and TRX4 to retrieve a sensed value for the trace TRX3. Similarly, when the touch IC 24 selects the traces TRX2 and TRX3 to retrieve a sensed value for the trace TRX2, the touch IC 26 selects the traces TRX4 and TRX5 to retrieve a sensed value for the trace TRX4. The process goes on analogously, in which the touch ICs 24 and 26 do not charge/discharge a same trace simultaneously.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A capacitive touch system, comprising:
   a touch panel having a plurality of first traces and a plurality of second traces, of which the plurality of first traces include a boundary trace;
   a first touch integrated circuit connected to the plurality of first traces to charge/discharge thereto; and
   a second touch integrated circuit connected to the plurality of second traces and the boundary trace to charge/discharge thereto;
   wherein the first and second touch integrated circuits do not charge/discharge the boundary trace simultaneously, whereby when the boundary trace is sensed by the first touch integrated circuit a first boundary connection to the second touch integrated circuit is deactivated and the second touch integrated circuit senses the plurality of second traces, and when the boundary trace is sensed by the second touch integrated circuit a second boundary connection to the first touch integrated circuit is deactivated and the first touch integrated circuit senses the other plurality of first traces.

2. The capacitive touch system of claim 1, wherein the boundary trace is floating to the second touch integrated circuit when the first touch integrated circuit charges/discharges the boundary trace.

3. The capacitive touch system of claim 1, wherein the boundary trace has a high impedance to the second touch integrated circuit when the first touch integrated circuit charges/discharges the boundary trace.

4. The capacitive touch system of claim 1, wherein the boundary trace is floating to the first touch integrated circuit when the second touch integrated circuit charges/discharges the boundary trace.

5. The capacitive touch system of claim 1, wherein the boundary trace has a high impedance to the first touch integrated circuit when the second touch integrated circuit charges/discharges the boundary trace.

6. A sensing method for a capacitive touch system including a touch panel having a boundary trace connected to two touch integrated circuits, the sensing method comprising:

(A) deactivating a first boundary connection to between the boundary trace and the second touch integrated circuit and sensing the plurality of second traces by the second touch integrated circuit when the first touch integrated circuit charges/discharges the boundary trace; and (B) deactivating a second boundary connection between the boundary trace and the first touch integrated circuit and sensing other the plurality of first traces by the first touch integrated circuit when the second touch integrated circuit charges/discharges the boundary trace.

7. The sensing method of claim 6, wherein the step A comprises making the boundary trace being floating to the second touch integrated circuit.

8. The sensing method of claim 6, wherein the step A comprises making the boundary trace having a high impedance to the second touch integrated circuit.

9. The sensing method of claim 6, wherein the step B comprises making the boundary trace being floating to the first touch integrated circuit.

10. The sensing method of claim 6, wherein the step B comprises making the boundary trace having a high impedance to the first touch integrated circuit.

* * * * *